United States Patent Office 2,835,599
Patented May 20, 1958

2,835,599

METHOD AND COMPOSITION FOR INHIBITING CORROSION

Rawson R. Snyder, Palos Verdes Estate, Calif., assignor to The Texas Company, New York, N. Y., a corporation of Delaware No Drawing. Application April 6, 1954
Serial No. 421,448

11 Claims. (Cl. 106—14)

The present invention relates to a novel method and composition for inhibiting atmospheric corrosion of such exposed metal parts as steel pipes, girders, reaction vessels, storage tanks, heat exchangers, and the like, particularly of the type found in chemical plants such as those wherein sulfuric acid is manufactured. The invention is particularly advantageous where the metal parts are hot, and where abnormally corrosive atmospheres are present, as in sulfuric acid plants.

Rust-proof compounds for application to metal surfaces have long been used. However, prior to the present invention there were no compounds available for successfully preventing the corrosion of hot metal parts such as those operating at temperatures of 100°–850° F. Among the main disadvantages of prior rust-proof compounds was their tendency to melt and run off hot metal members when applied, leaving only the thinnest of layers. Furthermore, even when a thin layer remained it tended to flake off due to the expansion and contraction of the metal when temperatures fluctuated. Still another disadvantage of prior rust-proof compounds is the relatively poor appearance they present both inherently and as a result of their remaining sufficiently tacky to absorb dirt from the atmosphere.

In accordance with the present invention a novel corrosion inhibiting compound is provided which overcomes the disadvantages discussed above. This is an intimate mixture of mineral cement powder with a petrolatum base compound to form a composition which will remain in place when applied on hot metal members, instead of running off. Furthermore, it solidifies at high temperatures and remains firmly in place even during expansion and contraction of metal members.

Desirably the cement is commercially available Portland cement which is present in an amount of 5–17% of the composition by weight. Other types can also be used, such as clay-mortar cements. Cement of any commercial fineness may be employed, such as all —200 mesh (U. S. standard). Cement not only mechanically thickens the composition, but also absorbs water of hydration from the atmosphere to set up as a firm layer binding the corrosion resistant petrolatum compound in place.

The petrolatum base compound constitutes 79–95% of the composition by weight, and is composed of 20–30% light petroleum solvent such as Stoddard solvent, 40–53% petrolatum, and 15–30% lubricating oil, all by volume. The solvent makes the composition thin enough to apply by brush or spray gun, but evaporates after application. The oil softens the petrolatum without excessively lowering its melting point, and acts to make a smooth blend of product.

To improve the appearance of the composition and to assist in maintaining it on metal surfaces even under severe expansion and contraction stresses, and under blows and abrasive forces, a small quantity of aluminum powder advantageously is included as an element of the novel corrosion inhibiting composition. For example, up to 16% by weight of a —200 mesh paint grade aluminum powder may be employed. Still another important ingredient which should be included in the composition for superior corrosion prevention is a corrosion inhibitor in an amount up to 5% by weight. Examples of such inhibitors are sodium chromate, sodium nitrate, lead naphthenate, zinc stearate, aluminum stearate, and sodium hexametaphosphate.

While many light petroleum solvents can be employed to prepare a composition of the desired consistency, such as light and heavy kerosenes or naphthas, and Stoddard solvent, the last named is ordinarily preferred. Such a Stoddard solvent is one having a gravity of 46–50° API, 50% of which distills below 350° F. and 90% of which distills below 375° F. Such a solvent evaporates rapidly when the corrosion inhibiting composition is applied to hot metal members, leaving behind a protective layer.

A suitable petrolatum for the composition of the invention is one having a melting point of 115–157° F., a penetration at 77° F. of 60–150, a Saybolt-Universal viscosity at 210° F. of 95–105 seconds, and a flash point, COC, of 480° F. minimum.

The oil used in the composition may be a naphthene base distillate lubricating oil such as one having a Saybolt-Universal viscosity at 100° F. of 200–216 seconds, a gravity of 20–23° API, and a flash point, COC, of 330° F. minimum. Another suitable lubricating oil is a steam refined cylinder stock having a Saybolt-Universal viscosity at 210° F. of 155–163 seconds, a flash point, COC, of 525° F. minimum, and a gravity of 21–24° API. I prefer to use a mixture of these two types of lubricating oil in such proportions by volume that the petrolatum base compound contains 5–10% of the former as a softening agent for the petrolatum, and 10–20% of the latter to soften the petrolatum and provide a smooth blend.

The primary constituents of the corrosion inhibiting composition have been described in detail above. It should be apparent to those skilled in the art, however, that numerous other minor constituents may be included which will not affect detrimentally the essential corrosion inhibiting properties of the composition to any substantial extent but which may add other properties, for example improved consistency of the compound and its ease of application to metal. Thus, the petrolatum base compound may include up to 3% of refined wool grease by volume to improve the texture of the compound for ease of application, up to 1% of butyl stearate, and up to 1% of carbon black.

When preparing a corrosion inhibiting composition of the type described in detail above, the petrolatum base compound is first formed by thoroughly mixing the described ingredients with one another while heating mildly, as at 100° F., for fluidity. This compound is heated for fluidity, for instance at a temperature of 100–150° F., and the cement powder with or without powdered aluminum is mixed into the fluid compound which is then allowed to cool. Thereafter the composition is applied with brushes or sprayed on the hot metal surfaces, which may range in temperature from 100° F. to 850° F. Ordinarily a coating of compound is desired which may be between 1/256 inch and 1/8 inch in thickness, or more. This usually requires the application of several coats of composition, such as 3 or 4, to give complete and satisfactory coverage.

In one example of how the corrosion inhibiting composition of the invention was employed, a composition was made up containing 10 parts of the described petrolatum base compound, 1 part of Portland cement, and 1.5 parts of aluminum powder, all by weight. The petrolatum base compound contained by volume 24% Stoddard Solvent, 47.7% petrolatum, 7.6% distillate lubricating oil, and 14.8% cylinder stock. This composition was brushed on the hot steel surfaces of a sulfuric acid plant, 4 coats being applied in most places.

After several months in service the coating was inspected and found still to be in very good condition. All surfaces were in an excellent state of preservation, with no rust apparent. The aluminum color was still present although slightly dull. Some slight amount of flaking had occurred on surfaces operating at temperatures of 650 to 850° F., but no flaking had occurred where operating temperatures were 500° F. and below. No dust accumulation was found on any of the coated surfaces except for a slight accumulation on those operating at temperatures of 100° F. and below.

The plant maintenance program required periodic shut down and cooling plus frequent water washing of equipment, during which my novel compound continued to adhere firmly.

Obviously, many modifications and variations of the invention, as hereinbefore set forth, may be made without departing from the spirit and scope thereof, and therefore only such limitations should be imposed as are indicated in the appended claims.

I claim:

1. A corrosion inhibiting composition for application to metal surfaces consisting essentially of 5–17% comminuted hydratable mineral cement selected from the group consisting of Portland cement and clay-mortar cement and 79–95% petrolatum base compound, by weight; said petrolatum base compound consisting essentially of 20–30% light petroleum solvent, 40–53% petrolatum, and 15–30% lubricating oil, all by volume.

2. A corrosion inhibiting composition in accordance with claim 1 wherein the ingredients are present in proportions of 1 part cement to 10 parts petrolatum base compound by weight.

3. A corrosion inhibiting composition in accordance with claim 1, also consisting essentially of aluminum powder in an amount to assist in maintaining said corrosion inhibiting composition on metal surfaces.

4. A corrosion inhibiting composition in accordance with claim 3, wherein the ingredients are present in proportions of 1 part cement to 1.5 parts aluminum to 10 parts petrolatum base compound, by weight.

5. A corrosion inhibiting composition compound in accordance with claim 1, also including a corrosion inhibiting amount up to 5% by weight of a corrosion inhibiting compound selected from the group consisting of sodium chromate, sodium nitrate, lead naphthenate, zinc stearate, aluminum stearate and sodium hexametaphosphate.

6. A method of protecting metal surfaces from corrosion, comprising applying thereto a composition consisting essentially of 5–17% comminuted hydratable mineral cement selected from the group consisting of Portland cement and clay-mortar cement, and 79–95% petrolatum base compound, by weight; said petrolatum base compound consisting essentially of 20–30% light petroleum solvent, 40–53% petrolatum, and 15–30% lubricating oil, all by volume.

7. A method in accordance with claim 6, wherein the ingredients are present in proportions of 1 part cement to 10 parts petrolatum base compound, by weight.

8. A method in accordance with claim 6, wherein said composition also consists essentially of aluminum powder in an amount to assist in maintaining said corrosion inhibiting composition on metal surfaces.

9. A method in accordance with claim 8, wherein the ingredients are present in proportions of 1 part cement to 1.5 parts aluminum to 10 parts petrolatum base compound, by weight.

10. A method in accordance with claim 6, wherein said composition also includes a corrosion inhibiting amount up to 5% by weight of a corrosion inhibiting compound selected from the group consisting of sodium chromate, sodium nitrate, lead naphthenate, zinc stearate, aluminum stearate and sodium hexametaphosphate.

11. A corrosion inhibiting composition for application to metal surfaces consisting essentially of 5–17% Portland cement and 79–95% petrolatum base compound, by weight; said petrolatum base compound consisting essentially of 20–30% light petroleum solvent, 40–53% petrolatum, and 15–30% lubricating oil, all by volume.

References Cited in the file of this patent

UNITED STATES PATENTS

| | | |
|---|---|---|
| 972,801 | Blackman | Oct. 18, 1910 |
| 1,104,782 | Craig | July 28, 1914 |
| 1,428,272 | Collings | Sept. 5, 1922 |
| 1,585,371 | Brogden | May 18, 1926 |
| 2,111,395 | Hartwick | Mar. 15, 1938 |
| 2,286,018 | Smith | June 9, 1942 |
| 2,595,158 | McCue et al. | Apr. 29, 1952 |

FOREIGN PATENTS

| | | |
|---|---|---|
| 248,463 | Great Britain | Mar. 4, 1926 |
| 291,486 | Great Britain | May 29, 1928 |
| 454,306 | Great Britain | Sept. 28, 1936 |

UNITED STATES PATENT OFFICE

CERTIFICATE OF CORRECTION

Patent No. 2,835,599

May 20, 1958

Rawson R. Snyder

It is hereby certified that error appears in the printed specification of the above numbered patent requiring correction and that the said Letters Patent should read as corrected below.

Column 3, line 45, strike out "compound".

Signed and sealed this 8th day of July 1958.

(SEAL)
Attest:

KARL H. AXLINE
Attesting Officer

ROBERT C. WATSON
Commissioner of Patents